(12) United States Patent
Faridian et al.

(10) Patent No.: US 11,372,315 B2
(45) Date of Patent: Jun. 28, 2022

(54) METHOD FOR ATTACHING A CAMERA OBJECTIVE TO AN OBJECTIVE HOLDER

(71) Applicant: Robert Bosch GmbH, Stuttgart (DE)

(72) Inventors: Ahmad Faridian, Weil der Stadt (DE); Andreas Moehrle, Kornwestheim (DE); Moritz Winkler, Waldbronn (DE); Nikolai Bauer, Moeglingen (DE); Reiner Ramsayer, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/015,309

(22) Filed: Sep. 9, 2020

(65) Prior Publication Data

US 2021/0072621 A1    Mar. 11, 2021

(30) Foreign Application Priority Data

Sep. 11, 2019 (DE) .......................... 102019213798.9

(51) Int. Cl.
*G03B 17/12* (2021.01)
*H04N 5/225* (2006.01)
*G02B 7/02* (2021.01)

(52) U.S. Cl.
CPC ............. *G03B 17/12* (2013.01); *G02B 7/026* (2013.01); *H04N 5/2254* (2013.01); *G02B 7/025* (2013.01)

(58) Field of Classification Search
CPC .......... G03B 17/12; G02B 7/00; G02B 7/026; H04N 5/2254
See application file for complete search history.

(56) References Cited

U.S. PATENT DOCUMENTS

| | | | |
|---|---|---|---|
| 6,229,657 B1 * | 5/2001 | Holderer | G03F 7/70241 359/822 |
| 2006/0049154 A1 | 3/2006 | Clifford et al. | |
| 2008/0204907 A1 * | 8/2008 | Blanding | G02B 7/023 359/823 |
| 2009/0103193 A1 * | 4/2009 | Berube | G02B 7/02 359/819 |
| 2018/0176429 A1 | 6/2018 | Avalos et al. | |
| 2019/0052782 A1 * | 2/2019 | Sung | B23K 26/22 |

FOREIGN PATENT DOCUMENTS

DE        102012223509 A1    8/2015

* cited by examiner

*Primary Examiner* — Noam Reisner
(74) *Attorney, Agent, or Firm* — Norton Rose Fulbright US LLP; Gerard Messina

(57) ABSTRACT

A method for attaching a camera objective to an objective holder. The method includes the steps of introducing the camera objective into an attaching element in the region of the objective holder, the attaching element having a plurality of contact elements that extend from a base body and lie elastically on the camera objective, of orienting the camera objective to an image sensor, and of welding the attaching element using a laser, so that the position of the camera objective to the objective holder is fixed.

13 Claims, 3 Drawing Sheets

METHOD FOR ATTACHING A CAMERA OBJECTIVE TO AN OBJECTIVE HOLDER

CROSS REFERENCE

The present application claims the benefit under 35 U.S.C. § 119 of German Patent Application No. DE 102019213798.9 filed on Sep. 11, 2019, which is expressly incorporated herein by reference in its entirety.

FIELD

The present invention relates to a method for attaching a camera objective to an objective holder, and to an attaching element for carrying out the method. In addition, the present invention relates to a camera objective system produced according to this method.

BACKGROUND INFORMATION

Camera systems are used in many areas. For example, such camera systems are used in motor vehicles as optical camera systems for acquiring information. Here, the camera systems acquire for example the environment around the vehicle, and supply information for other vehicle systems.

In the installation of (automotive) cameras, the orientation of the objective to the housing is carried out in active alignment. Here, the objective is oriented towards a reference point, and the projected image on the image sensor is thereby set to be sharp. In order to fix this position and to maintain it permanently, a dual-curing adhesive is usually used. This adhesive is applied to the adhesive surface of the objective holder before the active alignment, and, after the orientation, is exposed to UV light in order to undergo an initial, partial curing, and thus to temporarily hold the set position. Subsequently, the adhesive is cured in an oven with the camera module in order to obtain its final strength.

German Patent Application NO. DE 10 2012 223 509 A1 describes an imager module having an objective and a sensor carrier, an elastically deformable clamping device being tensioned between the objective and the sensor carrier. The tensioning enables a focusing, a centering, and an orientation of the longitudinal axis of the objective. In addition, the objective can be fixed using the clamping device.

SUMMARY

An object of the present invention is to provide a method for attaching a camera objective to an objective holder with which, after an orientation, the two can be more easily connected to one another, and by which the optical quality is improved. The object may be achieved in accordance with example embodiments of the present invention. Preferred specific embodiments of the present invention are described herein.

In accordance with an example embodiment of the present invention, a method is provided for attaching a camera objective to an objective holder. The method includes the steps of introducing the camera objective into an attaching element in the region of the objective holder, the attaching element having a plurality of contact elements that extend from a base body and lie elastically on the camera objective, of orienting the camera objective to an image sensor, and of welding the attaching element using a laser, so that the position of the camera objective to the objective holder is fixed.

The attaching element is preferably made of a metallic material, e.g., aluminum, but alternatively may also be made of plastic; using this element, a gap that is necessary for the orientation of the camera objective to the image sensor can be bridged, so that even during the orientation there is a permanent contact between contact elements of the attaching element and the camera objective. In order to ensure this, the contact elements have a flexible and adaptive geometry, and are correspondingly elastically positioned.

In the laser welding, the camera objective is connected to the objective holder without filler material, i.e., free of filler material. Preferably, here the components to be welded are made of the same material. The laser welding can be carried out easily and at low cost. In addition, in contrast to an adhesive process, no filler material is required, so that the disadvantages due to the filler material, because of the influence of temperature and humidity, are not present. Consequently, the optical properties dependent thereon are also improved.

In a preferred embodiment of the present invention, before the orientation of the camera objective, material is removed in an area between the base body and the contact elements. The removal is preferably carried out using a laser. Preferably, a slit is made in this region using the laser. This slit is preferably a maximum of 50 μm deep and wide. Here, the region between the base body and the contact elements forms a point of rotation of the contact elements relative to the base body. Correspondingly, in this way the elasticity is improved, or is first produced. As a result, the contact elements are movable during the orientation, so that a permanent contact between the contact elements and the camera objective is ensured.

In a further preferred embodiment of the present invention, the attaching element is put into place as a separate part before the introduction of the camera objective into the objective holder. This has the advantage that the objective holder can be made simpler and independent of the attaching element. Also, one objective mount can be used for different camera objectives. This merely requires the use of an attaching element that fits therewith. In this way, the cost efficiency of such an attachment method is improved.

Preferably, the base body is welded to the objective holder. A fastening of the attaching element to the objective holder is thereby simplified, so that the attaching element can also be fastened at low cost. The attaching element can here be fastened via three weld points or weld segments, or also via a circumferential weld seam.

In an advantageous development of the present invention, after the orientation the contact elements are welded to the camera objective in a contact region. As a result, the camera objective is fastened on the attaching element in the oriented position. Here as well, in this region no filler material is required to fasten the camera objective. Such a fastening can be produced easily and at low cost.

Advantageously, after the orientation of the camera objective a position of the contact elements to the base body is fixed. In this way, the possibility of movement with which the contact elements lie on the camera objective, and with which they follow the camera objective during orientation, is blocked in the oriented position. Correspondingly, there is a possibility of movement during the orientation, and subsequently adequate rigidity is provided to ensure the required optical quality.

In another advantageous embodiment of the present invention, for the fixing of the contact elements on the base body a region between the contact elements and the base body is melted using a laser. For this purpose, preferably, using the laser, a weld depth of between 10% and 100% of the component thickness at the weld point is selected. The fixing by the laser additionally has the advantage that it can be easily carried out. In addition, this can preferably be carried out in the same working step as the provision of the other laser welds. In this way, the attaching method can be carried out quickly and thus at low cost.

The present invention also provides an attaching element for carrying out the method. In accordance with an example embodiment of the present invention, the attaching element includes a base body from which a plurality of contact elements extend, the contact elements enclosing an inner diameter that is smaller than an outer diameter of a camera objective that is to be put in place. This inner diameter is correspondingly the diameter in an unloaded position of the contact elements, i.e., before the camera objective is put into place. Thus, with such an attaching element it is ensured that a contact between the attaching element and the camera objective is provided that is required for the welding. Correspondingly, with such an attaching element the method according to the present invention can be carried out, so that the corresponding advantages are achieved.

In addition, the present invention provides a camera objective system that is produced according to the method. In accordance with an example embodiment of the present invention, the camera objective system includes an objective holder into which a camera objective is introduced. Between the camera objective and the objective holder, there is situated an attaching element that has a plurality of contact elements that extend from a base body and lie on the camera objective, the attaching element having weld seams with which a position of the camera objective to the objective holder is fixed. Such a camera objective system correspondingly has no filler materials for fixing the camera objective. As a result, the temperature and humidity influences of these filler materials are eliminated, so that the optical properties during operation are improved.

Exemplary embodiments of the present invention are shown in the figures and are explained in more detail below.

DETAILED DESCRIPTION OF EXAMPLE EMBODIMENT

Figure 1:
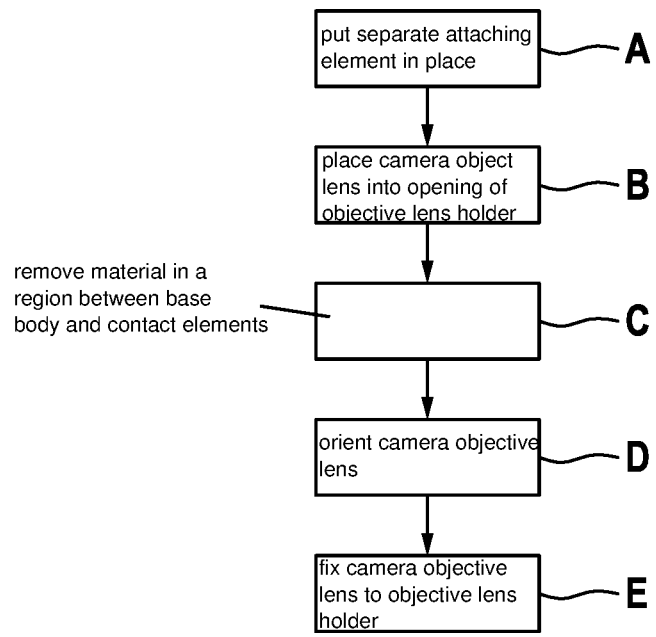
FIG. 1 shows an exemplary embodiment of a method according to the present invention.
Figure 2:
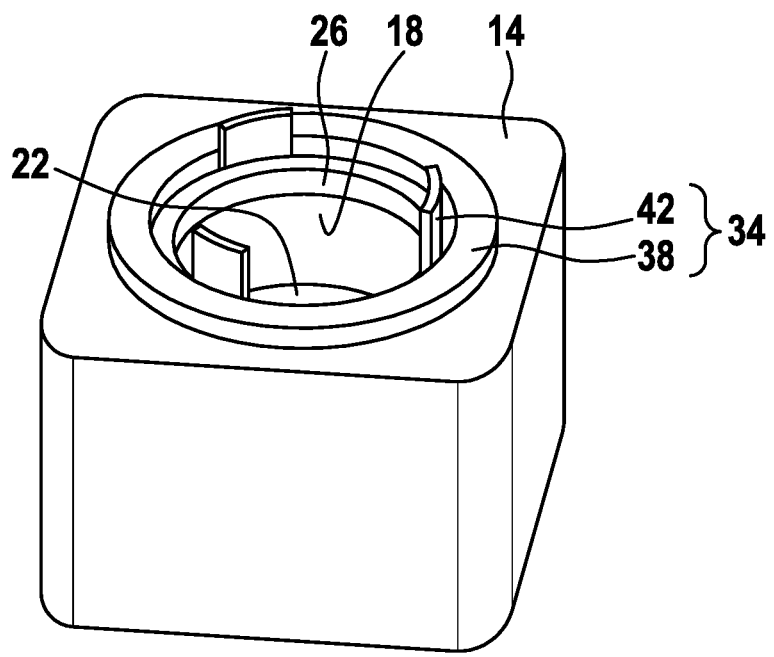
FIG. 2 shows an objective holder before the introduction of the camera objective in accordance with an example embodiment of the present invention.

FIG. 1 shows an exemplary embodiment of a method according to the present invention. The first method step A is explained in connection with FIG. 2. FIG. 2 shows an objective holder 14 having a round opening 18 on whose floor an image sensor 22 is placed. In opening 18, there is situated a sealing ring 26 via which a sealing connection can be produced to a camera objective 30 (see for example FIG. 3) that is to be situated in the opening.

At an end face of objective holder 14, in a first step A, a separate attaching element 34 was put in place. In this exemplary embodiment, attaching element 34 is formed from a base body 38 in the shape of an annular disk that has three contact elements 42. Contact elements 42 are here realized as webs, contact elements 42 extending from base body 38 in an axial direction opposite image sensor 22. An inner diameter $d_i$ enclosed by contact elements 42 is here smaller, before an introduction of camera objective 30, than an outer diameter $d_a$ of camera objective 30.

Figure 3:
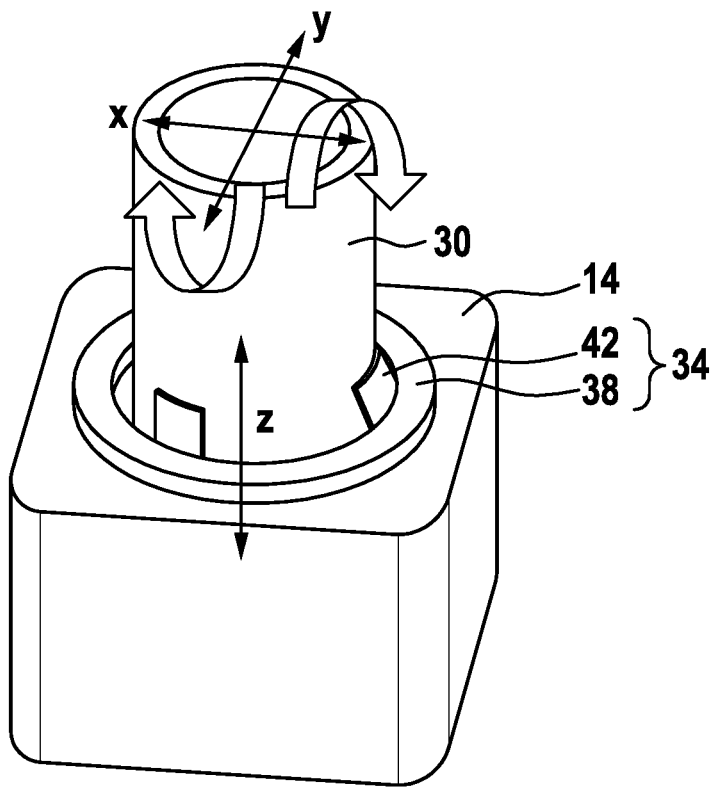
FIG. 3 shows the orienting of the camera objective in accordance with an example embodiment of the present invention.
Figure 4:
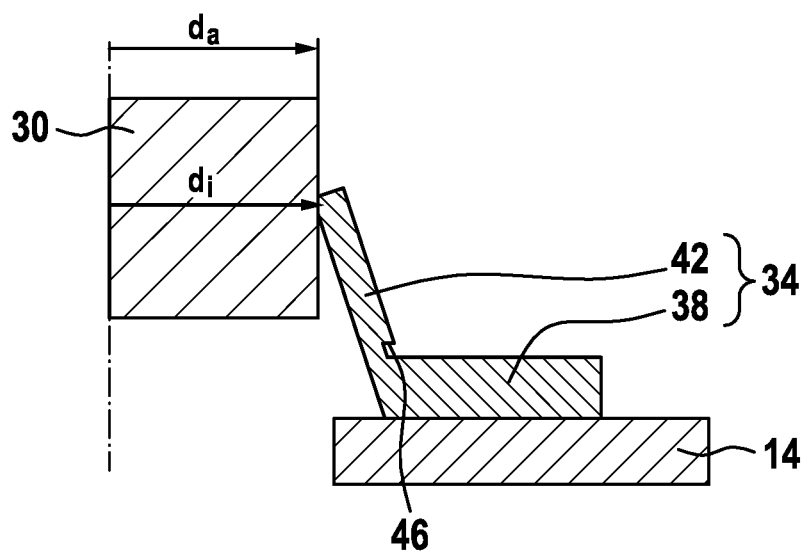
FIG. 4 shows a partial section through the attaching element and the camera objective before a fixing of the attaching element.
Figure 5:
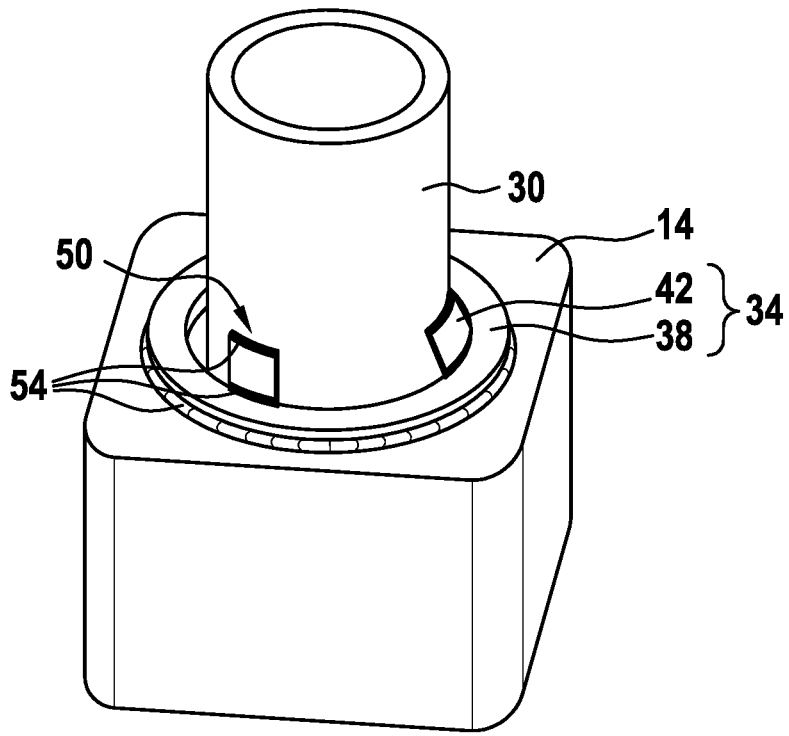
FIG. 5 shows a welded attaching element.
Figure 6:
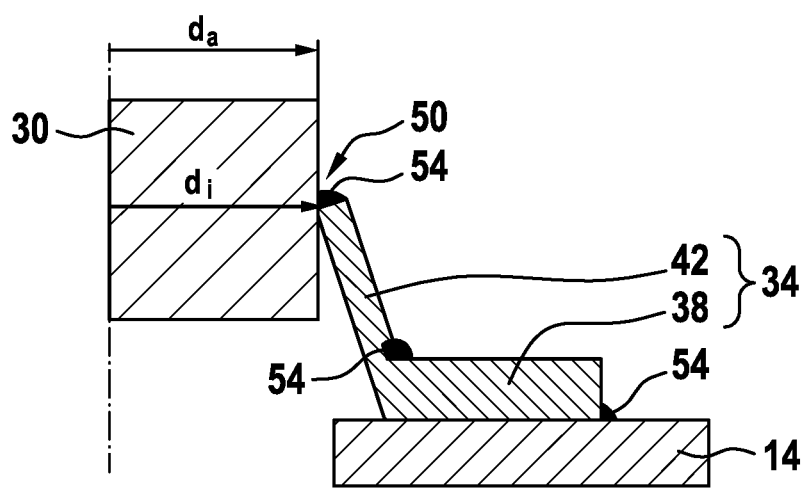
FIG. 6 shows a partial section through the attaching element and the camera objective after a fixing of the attaching element.

Second through fourth method steps B, C, D are explained in connection with FIGS. 3 and 4. In second method step B, camera objective 30 is placed into opening 18 of objective holder 14. Because the inner diameter $d_i$ enclosed by contact elements 42 is smaller than the outer diameter $d_a$ of camera objective 30, contact elements 42 lie elastically on camera objective 30. In order to improve this elasticity, in a third method step C material is removed in a region between base body 38 and contact elements 42, so that a slit 46 is formed (see FIG. 4). This slit 46 has a maximum gap width of 50 μm.

In the fourth method step D, camera objective 30 is oriented in objective holder 14, so that a required image quality is achieved. Here, camera objective 30 is moved translationally in an X and Y axis. In addition, camera objective 30 is oriented rotationally about the X and Y axis, and the sharpness is set via a subsequent translational movement in the Z axis. Camera objective 30 oriented in this way is held in this position.

Camera objective 30, thus oriented, is fixed to objective holder 14 in a fifth and final step E. For this purpose, contact elements 42 are welded to camera objective 30 in a contact region 50, using a laser. Because contact elements 42 lie on camera objective 30, no additional welding material is required for this. Using the laser, only the surface in contact region 50 is melted, so that the melted material bonds the two components 42, 30 to one another, and forms a weld seam 54. In order to fix contact elements 42 to base body 38, so that an elastic yielding of contact elements 42 is blocked, slit 46 between contact elements 42 and base body 38 is sealed with a further weld seam 54. Finally, base body 38 is connected to objective holder 14 with a weld seam 54.

What is claimed is:

1. A method for attaching a camera objective to an objective holder, the method comprising the following steps:
   introducing the camera objective into an attaching element in a region of the objective holder, the attaching element having a plurality of contact elements that extend from a base body and lie elastically on the camera objective;
   orienting the camera objective to an image sensor; and
   welding the attaching element using a laser, so that a position of the camera objective to the objective holder is fixed;
   wherein before the orientation of the camera objective, material is removed in a region between the base body and the contact elements to form a slit between the base body and each of the contact elements;
   wherein after the orientation of the camera objective, a position of the contact elements to the base body is fixed using a weld seam at each of the slits.

2. The method as recited in claim 1, wherein the attaching element is put in place as a separate part before the introduction of the camera objective into the objective holder.

3. The method as recited in claim 2, wherein the base body is welded to the objective holder.

4. The method as recited in claim 1, wherein after the orientation, the contact elements are welded to the camera objective in a contact region.

5. The method as recited in claim 1, wherein for the fixing of the contact elements to the base body, a region between the contact elements and the base body is melted using a laser.

6. The method as recited in claim 1, wherein the contact elements extend from the base body in a direction opposite from a direction of the base body to the image sensor.

7. A camera objective system, comprising:
a camera objective;
an objective holder into which the camera objective is introduced; and
an attaching element situated between the camera objective and the objective holder, the attaching element having a plurality of contact elements that extend from a base body and lie on the camera objective, the attaching element having weld seams with which a position of the camera objective to the objective holder is fixed;
wherein between the base body and each of the contact elements is a respective slit, the respective slits being sealed by a weld seam formed using a laser.

8. The method as recited in claim 1, wherein the camera objective is made of a metallic material.

9. The method as recited in claim 8, wherein the metallic material is aluminum.

10. The method as recited in claim 8, wherein the attaching element is made of the metallic material.

11. The camera objective system as recited in claim 7, wherein the camera objective is made of a metallic material.

12. The camera objective system as recited in claim 11, wherein the metallic material is aluminum.

13. The camera objective system as recited in claim 11, wherein the attaching element is made of the metallic material.

\* \* \* \* \*